United States Patent [19]
Pratt

[11] Patent Number: 5,620,287
[45] Date of Patent: Apr. 15, 1997

[54] FASTENER SYSTEM WITH CONTROLLED CLAMPING LOAD

[75] Inventor: John D. Pratt, Laguna Niguel, Calif.

[73] Assignee: Textron Inc., Providence, R.I.

[21] Appl. No.: 566,056

[22] Filed: Dec. 1, 1995

[51] Int. Cl.⁶ .............................. F16B 13/04; F16B 13/06
[52] U.S. Cl. ................................ 411/43; 411/69; 411/361
[58] Field of Search ................................ 411/43, 69, 70, 411/360, 361, 339

[56] References Cited

U.S. PATENT DOCUMENTS

| | | | |
|---|---|---|---|
| 4,405,256 | 9/1983 | King, Jr. | 411/69 |
| 4,784,551 | 11/1988 | Kendall | 411/43 |
| 4,846,611 | 7/1989 | Sadri et al. | 411/43 |
| 4,984,947 | 1/1991 | Flauraud | 411/43 |

Primary Examiner—Neill R. Wilson
Attorney, Agent, or Firm—Trexler, Bushnell, Giangiorgi & Blackstone, Ltd.

[57] ABSTRACT

A fastener structure for particular use in clamping a panel assembly includes a bolt or pin member having a generally elongate shank for extension through a panel, and a locking-recess in the shank for reception of a locking formation. The pin shank is insertable through a sleeve having a bore which terminates at an anvil portion surrounding the inserted pin shank. A lock collar is insertable into the sleeve bore radially between the shank locking-recess and the sleeve into abutment against the anvil portion of the sleeve. Compression of the locking collar against the abutting anvil portion of the sleeve produces cold flow deformation of a portion of the collar into the locking-recess of the shank to form a locked joint so that the collar then blocks any subsequent relative movement between the pin shank and sleeve to secure the fastener structure.

28 Claims, 2 Drawing Sheets

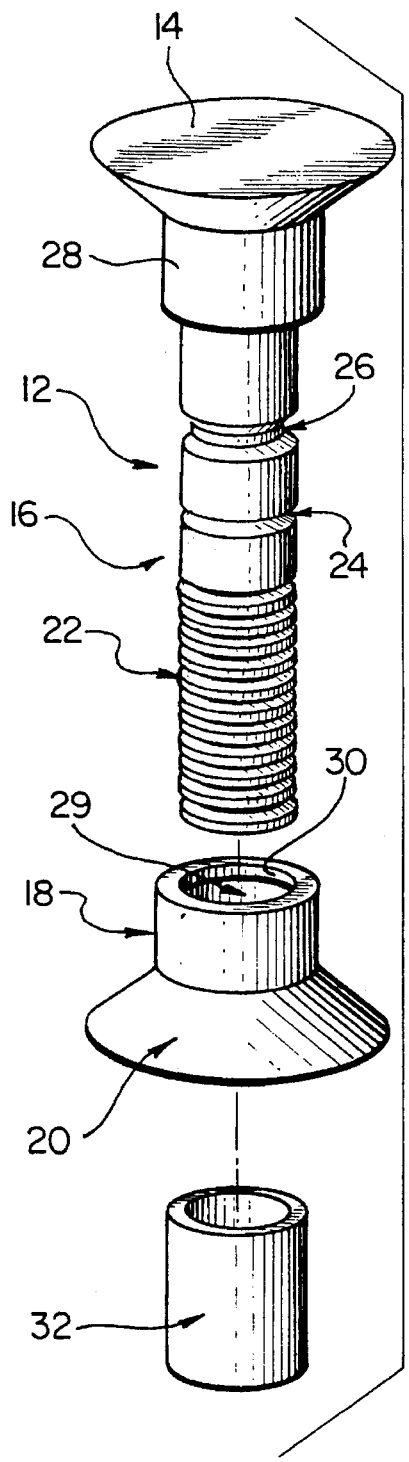
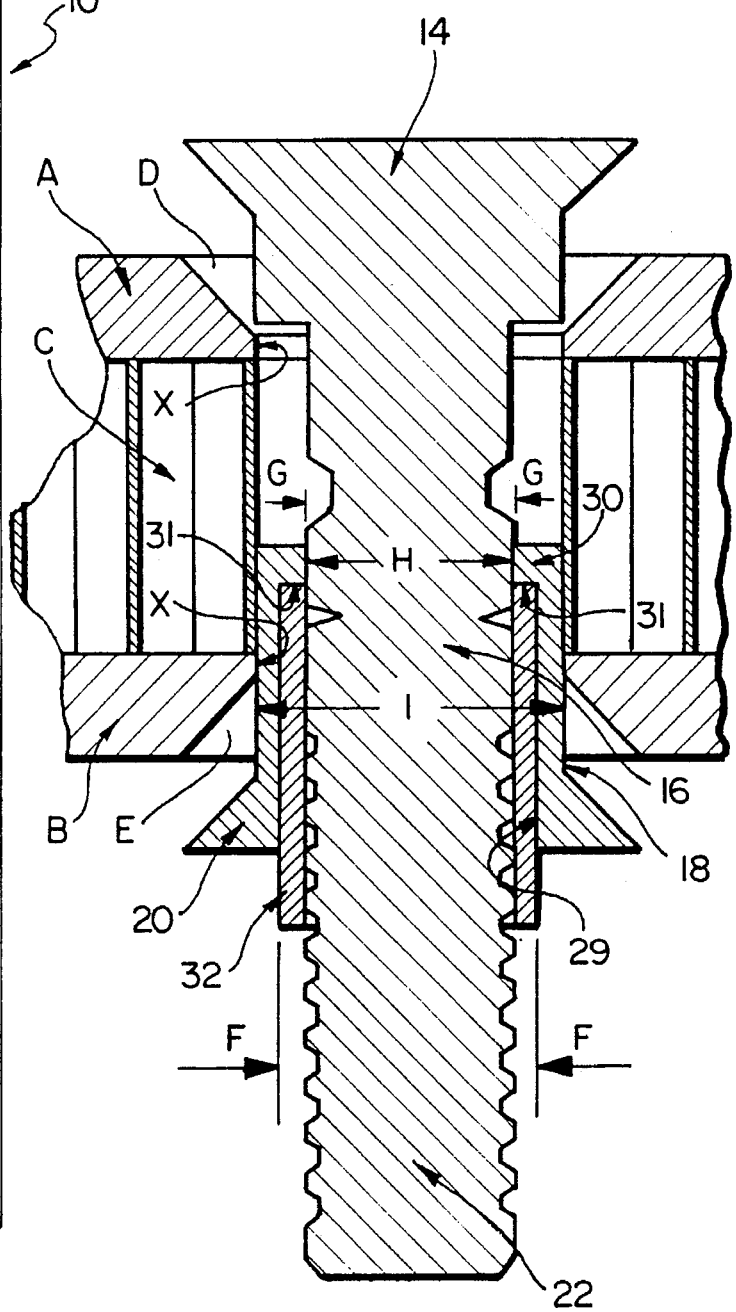

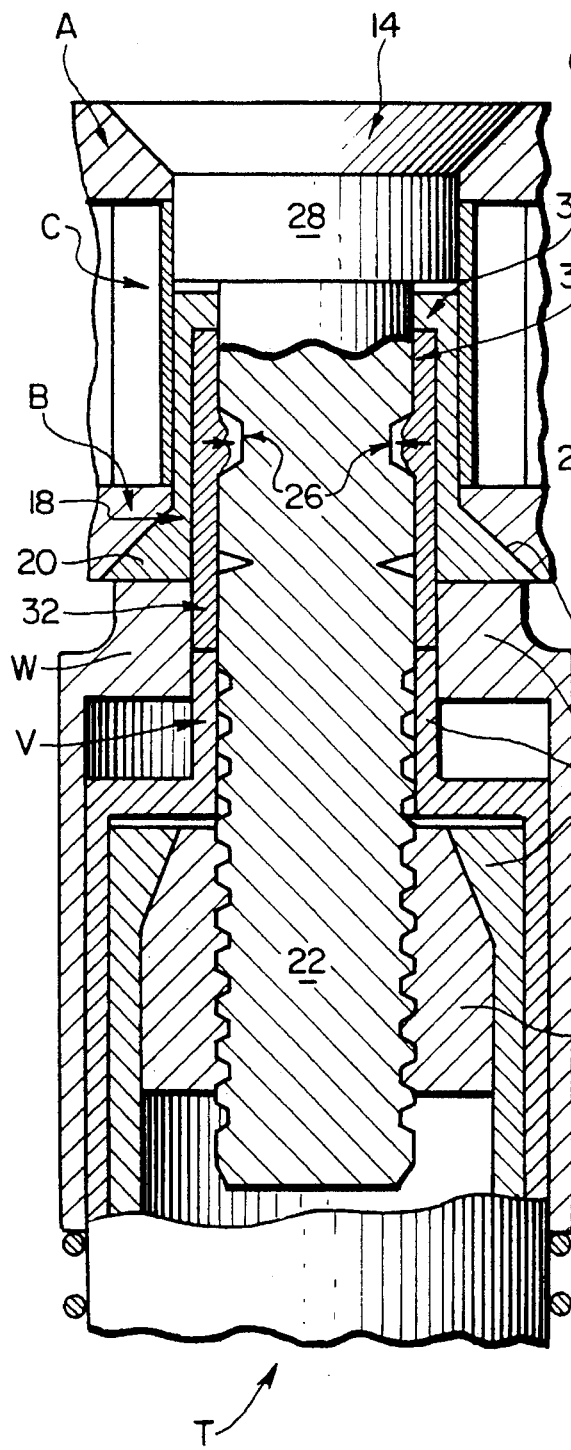
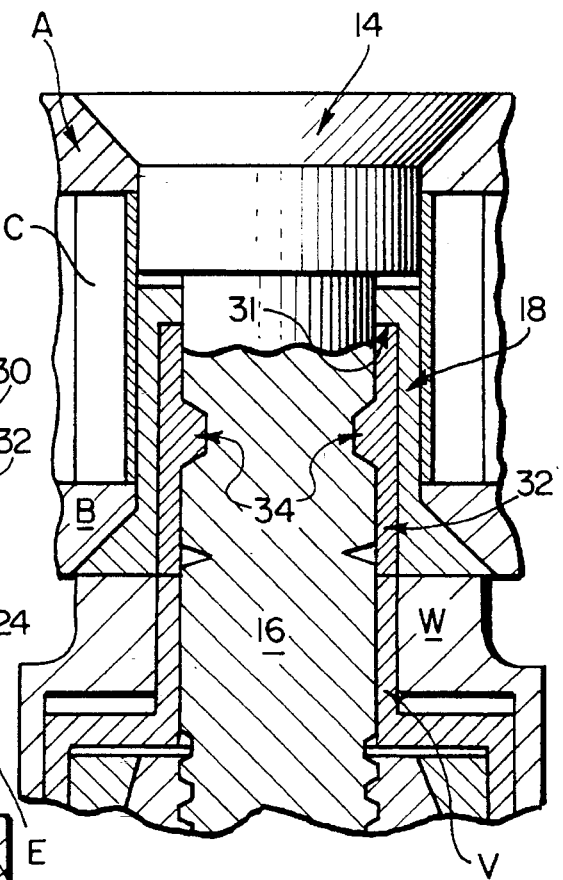
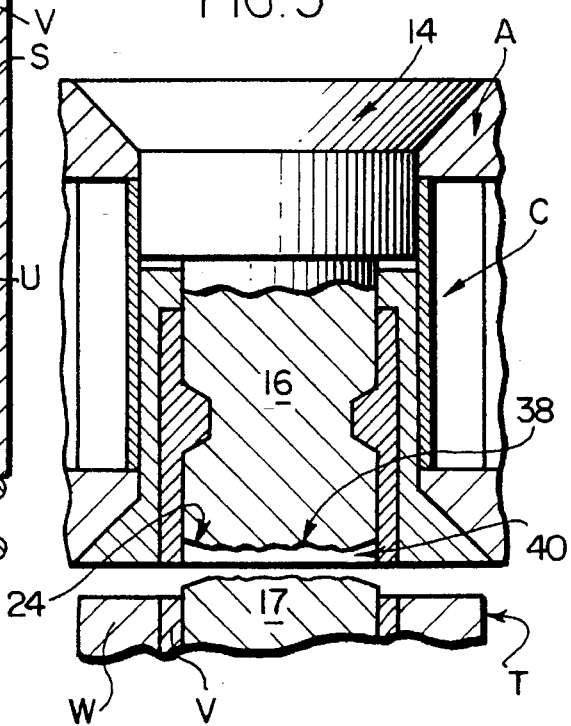

FASTENER SYSTEM WITH CONTROLLED CLAMPING LOAD

BACKGROUND

The present invention relates to fastener systems for use primarily in securing together layered or honeycomb panels, and more particularly relates to fastening of panels which may be relatively soft or delicate and of the type used in aircraft and aerospace applications.

In aircraft and other construction, rivet-type fastener locking has been employed to clamp securement of multi layer panel assemblies in which a soft core requires controlled compression in the fastener assembly, as described for example in U.S. Pat. No. 3,459,447, to avoid over clamping and damage to the panels. Further development has lead to blind rivet fasteners as described in U.S. Pat. No. 4,919,576 in which formation of the blind rivet also employs a separate "anvil washer" tool to deform the internal locking collar of the rivet. One of the panel clamping surfaces of the rivet fastener is created by swaged deformation of the portion which engages one of the panels, and the swaging formation represents potential damage to the panel surface and the integrity of the panel assembly. These and other disadvantages are eliminated by fastener structures in accordance with the present invention.

SUMMARY OF THE INVENTION

In accordance with the present invention, a fastener system for particular use in clamping a composite or honeycomb panel assembly includes a bolt or pin member having a generally elongate stem or shank for extension through a panel, and a locking-recess in the stem for reception of a deformed portion of a locking ring or collar. The pin stem is insertable through a sleeve having a bore which terminates at an anvil portion that surrounds the stem of the inserted pin shank. A lock collar is insertable into the sleeve bore radially between the stem locking-recess and the sleeve into abutment against the anvil portion of the sleeve. Compression of the locking collar against the abutting anvil portion of the sleeve by a setting tool produces cold-flow deformation of a portion of the locking collar into the locking-recess of the stem to form a locked joint so that the deformed collar then blocks any subsequent relative movement between the pin stem and sleeve to secure the fastener structure.

In a preferred illustrated embodiment, the pin member and sleeve member each have head portions for clamping engagement to secure a panel assembly or similar workpiece. The pin stem initially projects from the sleeve and panel assembly and is gripped and pulled by a power-setting tool which additionally forces compression of the lock collar against the anvil portion of the sleeve to produce the cold flow deformation and the resulting locking action to achieve a clamped joint. Subsequently, the stem or shank is fractured to locate the retained end of the fractured shank adjacent the exterior panel surface, most preferably slightly recessed therefrom, to allow finishing to a smooth surface particularly on aerodynamic panel surfaces. Alternatively, the stem may be fractured slightly above the outer surface of the sleeve, with the joint thereafter being "shaved" to provide a flush joint with the adjacent panel surfaces. The composition and yield deformation of the locking collar is variably correlated with the degree of clamp to which the panel assembly is subjected by the fastener structure, so that excessive clamp force is not applied for example to soft core "honeycomb" panels in aircraft panel assembly.

More specifically, when the composition of the panels to be clamped is taken into consideration, the tensile yield strength of the collar is adjusted accordingly. That is, the fastener may be used to clamp rather fragile panels, when the locking collar would be fabricated from relatively soft material such as aluminum or soft titanium, the later being preferred to the former where high temperatures may be encountered. For intermediate strength panels, a somewhat stronger collar material would be used such as nickel. Correspondingly, where the panels are more robust, high strength steel or titanium may be employed. The overall operation of the system will be briefly discussed hereinafter, and more completely in conjunction with the drawings and the detailed description thereof.

As the components of the fastening system are moved relative to each other, the clamping heads on the pin and the sleeve will engage opposite surfaces of the panel assembly. Continued movement or force applied to the pin or sleeve by means of the setting tool will be transferred into clamp loading on the panel assembly, so long as the locking collar remains intact, that is not deformed. As noted above, force is applied to the sleeve via the locking collar being engaged against an anvil surface on the sleeve. Thus, the joint will be increasingly loaded until such time as the locking collar begins to deform. Once the collar starts to deform, the major portion of the applied force will then go into deformation of the locking collar, until deformed into the locking groove. This effectively stops or ceases the increase in application of clamping load to the panel via the head portion of the sleeve and stem. Thus, by using locking collars with known or determined tensile yield strength and characteristics, the loading on the panel applied by the fastener system can be predicted and controlled.

Thus, with the fastener system of the preset invention, the design engineer can select the locking collar that will best suit the panel construction, and a controlled loading of the joint within certain parameters can be achieved. Of significance is the fact that this controlled load is attained without control of the setting tool, and with relatively little skill required of the operator. Also, as can be appreciated, the basic construction of the fastener system, namely the pin and sleeve, remain the same throughout the range of applications. Only the material of the locking collar need be changed to accommodate the type of panel or joint. In practice, it is envisioned that the locking collar will be color-coded to identify the predetermined tensile yield strength thereof.

BRIEF DESCRIPTION OF THE DRAWINGS

FIG. 1 is an exploded view of one embodiment of a fastener system according to the present invention;

FIG. 2 is an enlarged sectional view showing preparatory assembly of the fastener system shown in FIG. 1 employed in clamping a panel assembly;

FIG. 3 is a sectional view similar to FIG. 2 further illustrating tool engagement to secure the fastener system, and at an intermediate point in the application of the fastener system, at the time the lock collar begins to deform or collapse; and FIGS. 4 and 5 are sectional views similar to FIG. 3 illustrating sequential progression to complete securement of the fastener system and panel assembly.

DETAILED DESCRIPTION OF THE ILLUSTRATED EMBODIMENT

Referring to FIGS. 1 and 2, a fastener system or assembly in accordance with the present invention is generally designated by reference numeral 10. In the illustrated embodiment, the fastener system 10 comprises an elongate bolt or pin member 12 with an enlarged head 14 and projecting stem 16 to which a bored sleeve member 18 becomes locked in the secured assembly. The sleeve 18 also has an enlarged head 20, and in the illustrated embodiment, the bolt head 14 and sleeve head 20 are adapted to secure clamping of a panel assembly, for example, in which a softer core material C, such as an aircraft honeycomb composition, is sandwiched between two metallic panels A and B with respective countersink holes D and E which receive respective enlarged heads 14 and 20 as shown in FIG. 2. In the illustrated embodiment, the bolt stem 16 has longitudinal segments sequentially providing a serrated stem portion 22 remotely extending from an annular, fracture groove 24 which is axially spaced from a wider annular locking groove 26 located closer toward the head 14. In the illustrated embodiment, the shank 16 also has a larger diameter annular shoulder portion 28 located immediately adjacent to the enlarged head 14, which shoulder portion acts to fill the hole in the workpieces.

The sleeve 18 has a through bore 29 which opens through the head 20 and receives the stem 16 of the pin member 12. The sleeve 18 has a first larger diameter F and a second smaller diameter G portion opening through the mouth to define a terminal annular rim formation 30 which provides an anvil structure or surface 31 on the sleeve 18 as more fully described hereinafter.

Referring again to FIG. 2, the bolt stem 16 and serrated portion 22 have diameter H dimensioned to allow narrow clearance through the slightly larger inner diameter G of the anvil portion 30 of the sleeve 20 so that the stem 16, including the serrated stem portion 22 can pass therethrough with projection of the serrated stem portion 22 from the sleeve head 20, following insertion of the bolt 12 through the aligned fastener bores X of the assembled panels A, B and C.

The outer diameter I of both the sleeve 18 and of the anvil portion 30 is slightly smaller than the panel bore diameter X to allow snug fitting insertion of the sleeve 18 so that the anvil portion 30 will extend into the medial, honeycomb panel C. As particularly shown in FIG. 2, the annular space formed between the shank diameter H and the larger diameter F of the sleeve bore 29 is provided for insertion therebetween of a cylindrical lock ring or collar 32 into end abutment against the anvil surface 31 of portion 30.

FIG. 2 illustrates a preparatory stage of an assembly in which the bolt member 12 has been inserted through the aligned bores X of the assembled panels A, B and C after which the lock ring 32 is inserted into the sleeve 20 and the sleeve 20 is then slipped onto the bolt shank 16 so that the respective heads 14 and 20 approach the receptive counterbores D and E of the external panels A and B. Thereafter, referring to FIG. 3, a combined pull/push type rivet or setting tool T is employed to produce locking of the fastening system. The tool T is of a design and construction known in the fastener art and has a support collet S and a chuck-like portion U which engages the serrated portion 22 of the bolt shank 16. Activation of the tool causes the pulling of the shark portion 22 longitudinally through the tool to set the bolt head 14 into the panel counterbore D; at the same time, a projecting ram portion V of the tool T engages and forwardly drives against the exposed end of the lock ring collar 32 which thereby moves inwardly of the sleeve 18 and head portion 20 set into the panel counterbore E. The tool T will pull the bolt head 14 against panel A, while forcing the sleeve head 20 against panel B to produce panel clamping action against the medial panel C. More specifically, pulling of the serrated portion 22 of the stem, causes the pin 12 to move inwardly of the panel bore bringing the enlarged head 14 into engagement with the outer surface. Correspondingly, the ram portion V forces the locking collar 32 against the anvil surface 31 on sleeve 18 to move the sleeve 20 inwardly of the panel bore in a direction toward the shoulder 28, bringing the enlarged head portion 20 of sleeve 18 into engagement with the opposite side B of the panel.

The composition and surface finish/coating of the lock ring collar 32 including its tensile yield strength is chosen so that the compression of the lock ring collar 32 between the tool ram V and the sleeve anvil portion 30 will reach a desired yield pressure, a predetermined clamping load thereon at which the ring 32 will begin radial deformation of the material into the locking groove 26 as shown in FIG. 3. Since the ram pressure against the locking ring or collar 32 is transmitted against the anvil portion 30 and sleeve 18, the pressure at which the lock ring or collar 32 begins deformation is also the maximum clamping pressure applied by the fastener system. Accordingly, when the medial panel C is a relatively fragile aircraft honeycomb composition, the lock ring collar composition must be correlated to deform into the locking groove 26 at lower ram pressures relative to a more robust or rigid composition of the medial panel C (or panels A or B). For example, very fragile panels may dictate use of a lock ring collar 32 of soft aluminum composition chosen for ram deformation and corresponding maximum compressive load on the fragile honeycomb panels, while stronger panel compositions and higher load operating performance of the panel assembly may require corresponding higher tenacity of the locking joint at groove 26 demanding that the lock ring collar 32 have a composition in a progressive range of strength for example from nickel to steel or titanium. To ensure that the collar deformation is localized into the shank lock groove 26, the tool T is preferably provided with a forwardly positioned annular support wall or collar W which prevents any buckling of the lock ring collar 32 exterior of the joint or at the exposed portion thereof engaged by the ram V, as shown in FIGS. 3 and 4.

Referring now to FIG. 4, as the lock ring collar 32 is compressed against the sleeve anvil portion 30, it is reduced in length as the material deformation flows inwardly and fills the shank lock groove 26 to form annular locked joint 34, the reduced length of the lock ring collar 32 will preferably result in the displaced, outer end portion of the collar becoming substantially flush, as indicated at 36, with the sleeve head 20 and the exterior surface of the panel B.

Although the location of the lock groove 26 and resulting lock joint 34 are longitudinally spaced from the anvil portion 30 in the illustrated embodiment, the lock groove and anvil portion can be relatively located to cold deform the abutting end of the lock collar into the lock groove, where beneficial.

As the tool nut portion U continues to exert a tensile loading on the threaded portion 22 of the bolt stem 16, the stem 16 will fracture at the fracture groove 24 as shown in FIG. 5, subsequent to formation of the lock joint 34 so that the fractured stem fragment 17 is removed with the tool nut U. The fracture groove 24 can be located on the shank 16 and of a predetermined yield strength so that the fracture preferably results in the fractured end 38 of the retained shank 16 located in slightly recessed relation to the sleeve head 20 and flush collar end 36. The slightly recessed shank end 38 is particularly beneficial when located against an aerodynamic surface of panel B so that any resulting cavity 40 can be conveniently filled by potting to continue a smooth aerodynamic surface. Alternatively, the fracture groove 24 can be located along the pin shank 16 for fracture leaving a retained shank end projecting from the external panel surface where grinding or shaving can be employed to flush the joint at the location of the panel assembly and fastener joint.

Thus, with the present invention, the fastener engineer can allow a controlled clamping force, or a close approximation, by knowing the parameters of the system and selecting the material of the locking collar 32 to provide a desired tensile yield strength. Further, the variability in and control of the clamping load is achieved by varying but a single component of the system, the pin and sleeve constitution remaining constant for all applications, except for the length of the stem and position of the frangible groove 24.

While a preferred embodiment of the present invention is shown and described, it is envisioned that those skilled in the art may devise various modifications and equivalents without departing from the spirit and scope of the invention as defined by the appended claims.

The invention claimed is:

1. A fastener system for particular use in clamping a panel assembly; said fastener system comprising:

a pin member including a head for clamping engagement of a panel surface, and a generally elongate shank projecting from said head for extension through said panel, and a locking-recess formed in said shank for reception of a locking formation therein;

a fastener sleeve having a bore through which said pin shank is insertable, and an anvil portion formed on an inner portion of said sleeve; and a lock collar insertable into said sleeve bore radially between said shank and said sleeve and into abutment with said anvil portion, and said collar is configured and arranged to enable subsequent application of sufficient force upon said collar to force the collar axially relative to the sleeve thereby compressing the collar against said abutting anvil portion to produce cold-flow deformation of a portion of said collar into said shank locating-recess to form said locking formation therein and secure fastening of said pin shank and said sleeve.

2. A fastener system according to claim 1, wherein said abutting anvil portion of said sleeve projects radially inwardly toward said inserted pin shank.

3. A fastener system according to claim 2, wherein said abutting anvil portion of said sleeve defines an internal shoulder formed by said bore and said anvil portion.

4. A fastener system according to claim 1, wherein said abutting anvil portion of said sleeve comprises an annular rim formation radially projecting inwardly toward said pin shank.

5. A fastener system according to claim 1, wherein said abutting anvil portion is arranged at an end of said sleeve bore toward said pin head.

6. A fastener system according to claim 1, wherein said anvil portion of said sleeve forms one end of said sleeve toward said pin head.

7. A fastener system according to claim 5, wherein said sleeve further comprises a second end formed by a head for engagement of a panel surface.

8. A fastener system according to claim 1, wherein said locking recess comprises an annular groove formed in said pin shank.

9. A fastener system according to claim 1, wherein said lock collar and sleeve are dimensioned and arranged to be slidable past said shank locking recess without deformation of said collar, followed by said subsequent collar compression against said anvil portion of said sleeve.

10. A fastener system according to claim 1, wherein said pin shank further includes a preformed, fracture-promotion structure therein.

11. A fastener system according to claim 10, wherein said preformed, fracture-promotion structure comprises a circumferential groove formed therein.

12. A fastener system comprising:

a pin member including a generally elongate shank and a locking-recess found in said shank for reception of a locking formation therein;

a fastener sleeve having a bore through which said pin shank is insertable, and an anvil portion on said sleeve; and a lock collar composed of deformable metal and insertable into said bore radially between said shank locking-recess and sleeve and into abutment against said anvil portion with a ramming end of said collar extended axially from an end of said sleeve oppositely located relative to said anvil portion thereof, to enable subsequent application of sufficient force upon said collar ramming end and compression of the collar against said abutting anvil portion to produce flow deformation of a portion of said collar into said shank locking-recess to form said locking formation therein and secure fastening of said pin shank and said sleeve.

13. A fastener system according to claim 12, wherein said locking formation is located medially between respective axial ends of said lock collar.

14. A fastener system according to claim 12, wherein said locking formation of said lock collar is located at a position spaced from said abutted anvil portion.

15. A fastener system according to claim 12, wherein said pin shank further includes a preformed, fracture-promotion structure therein.

16. A fastener system according to claim 12, wherein said locking collar is fabricated from a specific material selected from a group of material which can provide a low tensile yield strength, to an intermediate tensile yield strength, to a high tensile yield strength.

17. A fastener system for particular use in clamping a panel assembly; said fastener system comprising:

a pin member including a head for clamping engagement of a panel surface, and a generally elongate shank projecting from said head for extension through said panel, and a locking-recess formed in said shank for reception of a locking formation therein;

a fastener sleeve having a bore through which said pin shank is insertable, and an anvil portion formed on the inner portion of said sleeve; and a lock collar insertable into said sleeve bore radially between said shank and said sleeve and into abutment with said anvil portion, and arranged to enable subsequent application of sufficient force upon said collar and compression thereof against said abutting anvil portion to produce cold-flow deformation of a portion of said collar into said shank locking-recess to form said locking formation therein, wherein said locking formation is located medially between respective axial ends of said lock collar, to secure fastening of said pin shank and said sleeve.

18. A fastener system for particular use in clamping a panel assembly; said fastener system comprising:

a pin member including a head for clamping engagement of a panel surface, and a generally elongate shank projecting from said head for extension through said panel, and a locking-recess formed in said shank for reception of a locking formation therein;

a fastener sleeve having a bore through which said pin shank is insertable, and an anvil portion formed on the inner portion of said sleeve; and a lock collar insertable into said sleeve bore radially between said shank and said sleeve and into abutment with said anvil portion, and arranged to enable subsequent application of sufficient force upon said collar and compression thereof against said abutting anvil portion to produce cold-flow deformation of a portion of said collar into said shank locking-recess to form said locking formation therein, wherein said locking formation of said lock collar is located at a position spaced from said abutted anvil portion and secure fastening of said pin shank and said sleeve.

19. A fastener system for particular use in clamping a panel assembly; said fastener system comprising:

a pin member including a head for clamping engagement of a panel surface, and a generally elongate shank projecting from said head for extension through said panel, and a locking-recess formed in said shank for reception of a locking formation therein;

a fastener sleeve having a bore through which said pin shank is insertable, and an anvil portion formed on the inner portion of said sleeve; and a lock collar insertable into said sleeve bore radially between said shank and said sleeve and into abutment with said anvil portion, and arranged to enable subsequent application of sufficient force upon said collar and compression thereof against said abutting anvil portion to produce cold-flow deformation of a portion of said collar into said shank locking-recess to form said locking formation therein, wherein said lock collar has a generally cylindrical configuration and said locking formation is defined by said deformation thereof medially located between respective axial ends of said cylindrical configuration, to secure fastening of said pin shank and said sleeve.

20. A fastener system, in combination with at least one panel through which a pin shank is projected for particular use in clamping the panel; said fastener system comprising:

a pin member including a head for clamping engagement of a panel surface, and a generally elongate shank projecting from said head for extension through said panel, and a locking-recess formed in said shank for reception of a locking formation therein;

a fastener sleeve having a bore through which said pin shank is insertable, and an anvil portion formed on the inner portion of said sleeve; and a lock collar insertable into said sleeve bore radially between said shank and said sleeve and into abutment with said anvil portion, and arranged to enable subsequent application of sufficient force upon said collar and compression thereof against said abutting anvil portion to produce cold-flow deformation of a portion of said collar into said shank locking-recess to form said locking formation therein and secure fastening of said pin shank and said sleeve, wherein said pin shank further includes a preformed, fracture-promotion structure therein, said fracture-promotion structure being arranged along said pin shank to locate fracture of said shank at a position recessed with respect to an exterior surface of said panel, to produce a pottable cavity defined by said exterior panel surface peripheral to said recessed shank fracture.

21. A fastener system comprising:

a pin member including a generally elongate shank and a locking-recess found in said shank for reception of a locking formation therein;

a fastener sleeve having a bore through which said pin shank is insertable, and an anvil portion on said sleeve; and a lock collar insertable into said bore radially between said shank locking-recess and sleeve and into abutment against said anvil portion, and arranged to enable subsequent application of sufficient force upon said collar and compression thereof against said abutting anvil portion to produce flow deformation of a portion of said collar into said shank locking-recess to form said locking formation therein, wherein said lock collar has a generally cylindrical configuration and said locking formation is defined by said deformation thereof medially located between respective axial ends of said cylindrical configuration, to secure fastening of said pin shank and said sleeve.

22. A fastener system, in combination with at least one panel through which said pin shank is projected, comprising:

a pin member including a generally elongate shank and a locking-recess found in said shank for reception of a locking formation therein;

a fastener sleeve having a bore through which said pin shank is insertable, and an anvil portion on said sleeve; and a lock collar insertable into said bore radially between said shank locking-recess and sleeve and into abutment against said anvil portion, and arranged to enable subsequent application of sufficient force upon said collar and compression thereof against said abutting anvil portion to produce flow deformation of a portion of said collar into said shank locking-recess to form said locking formation therein and secure fastening of said pin shank and said sleeve, wherein said pin shank further includes a preformed, fracture-promotion structure therein, said fracture-promotion structure being arranged along said pin shank to locate fracture of said shank at a position recessed with respect to an exterior surface of said panel, to produce a pottable cavity defined by said exterior panel surface peripheral to said recessed shank fracture.

23. A fastener system comprising:

a pin member including a generally elongate shank and a locking-recess found in said shank for reception of a locking formation therein;

a fastener sleeve having a bore through which said pin shank is insertable, and an anvil portion on said sleeve; and a lock collar insertable into said bore radially between said shank locking-recess and sleeve and into abutment against said anvil portion, and arranged to enable subsequent application of sufficient force upon said collar and compression thereof against said abutting anvil portion to produce flow deformation of a portion of said collar into said shank locking-recess to form said locking formation therein, wherein said lock collar is fabricated from a specific material selected from a group of materials ranging to provide a low tensile yield strength, to an intermediate tensile yield strength, to a high tensile yield strength, and wherein said lock collar materials are color-coded to identify a predetermined tensile yield strength, to secure fastening of said pin shank and said sleeve.

24. A method of joining together workpieces with a deformable fastener system, comprising the steps of: providing at least two apertured workpieces; providing a fastener system including a pin member for disposition in said aperture, a deformable locking collar, a sleeve member having a head portion for engaging a side of the workpiece opposite said pin member and a through bore for receiving said pin member and said sleeve being radially spaced from said pin member for reception of the locking collar in the resulting annular spacing, and further including an anvil surface against which the collar abuts; selecting the material from which said locking collar is fabricated to provide a tensile yield strength for said collar that will achieve a predetermined clamp load on said workpiece when said fastener system is set; and setting said fastener system by deforming said lock collar into engagement with said pin member such that a predetermined clamp load is attained before said collar starts to deform, and commencing deformation of said locking collar producing a desired locking action without appreciably increasing the clamp load.

25. A method according to claim 24, wherein the step of providing a fastener system including the step of collar coding said locking collars to identify collars with a predetermined tensile yield strength.

26. A method according to claim 24, wherein the step of providing a fastener system further includes, providing a sleeve member having a head portion for engaging a side of the workpiece opposite said pin member and a through bore for receiving said pin member and said sleeve being radially spaced from said pin member for reception of the locking collar in the resulting annular spacing, and further including an anvil surface against which the collar abuts.

27. A method according to claim 23, wherein the step of setting said fastener system including the steps of applying a tensile load to said pin member while loading said locking collar in compression such that the engagement of said collar with said anvil surface moves said collar axially of said pin member, opposite of said tensile loading, to allow a clamping action, with said locking collar deforming at a predetermined loading to attain a locked joint with a clamp load within a selected range.

28. A method according to claim 27, wherein said locking collar are color-coded to indicate different respective predetermined tensile yield strengths, and said method further includes the step of selecting one of said locking collars of a desired tensile yield strength.

* * * * *

UNITED STATES PATENT AND TRADEMARK OFFICE
CERTIFICATE OF CORRECTION

PATENT NO. : 5,620,287
DATED : April 15, 1997
INVENTOR(S) : John D. Pratt

It is certified that error appears in the above-indentified patent and that said Letters Patent is hereby corrected as shown below:

Column 3, Line 65   "shark"   should be -- shank --

Signed and Sealed this

Ninth Day of September, 1997

BRUCE LEHMAN

*Attest:*

*Attesting Officer*            *Commissioner of Patents and Trademarks*